May 28, 1929.  E. SIMMONS  1,715,103

WAFFLE IRON

Filed Feb. 10, 1927

INVENTOR
Elta Simmons
BY
Hauff & Warland
ATTORNEYS

Patented May 28, 1929.

1,715,103

UNITED STATES PATENT OFFICE.

ELTA SIMMONS, OF NEW YORK, N. Y.

WAFFLE IRON.

Application filed February 10, 1927. Serial No. 167,256.

This invention relates to a waffle iron or cooking utensil in which a lower member having a substantially semicircular cavity or compartment is adapted to receive the batter and a cover provided with a semicircular rib coacts with the cavity to produce an article of food such as a waffle or cake of practically the same shape as the cavity.

An object of the invention is to corrugate the lateral walls of the lower member in order to give a greater heating surface so as to thoroughly and quickly cook the batter.

Another object of the invention is to produce a hollow food article adapted to be filled with any desired confection, jelly, or other comestible.

The invention resides more particularly in the novel combinations hereinafter described and claimed, reference being made to the accompanying drawing in which:

Figure 1:
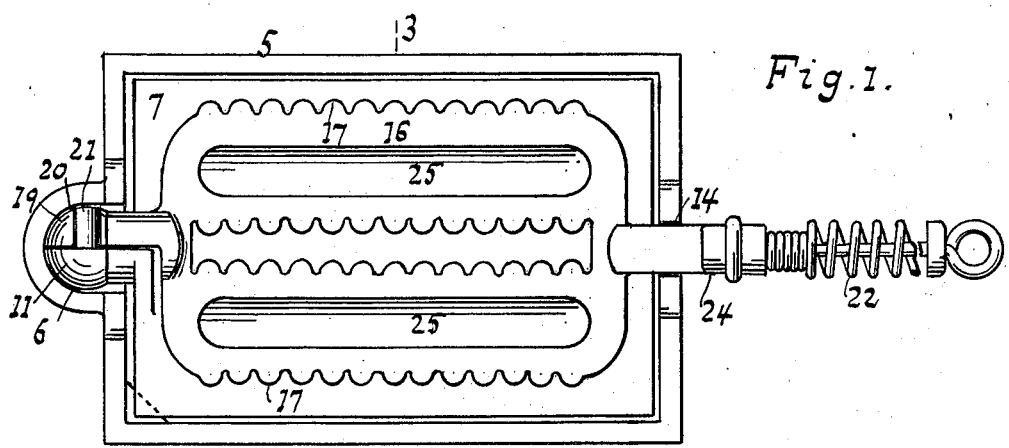
Fig. 1 represents a top view of a waffle iron embodying this invention.
Figure 2:
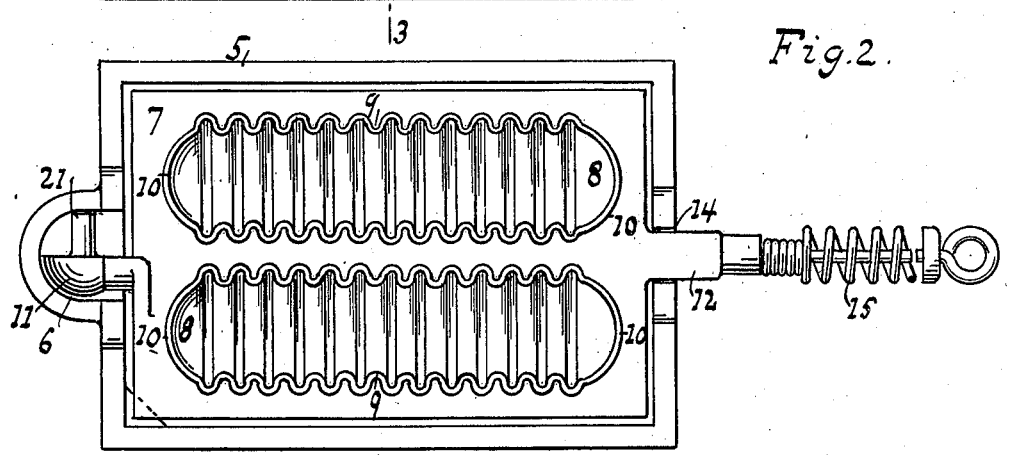
Fig. 2 is a similar view showing the cover removed.
Figure 3:
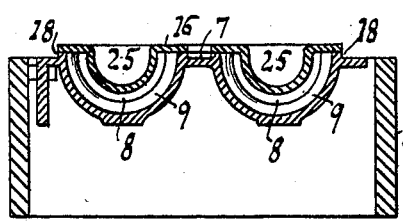
Fig. 3 is a transverse section taken along the line 3—3 of Fig. 1.

In the drawing the numeral 5 designates a base open at the top and bottom and having a socket 6 projecting from the rear end of the base. A lower member 7 having a longitudinal cavity 8 serving as a receptacle to receive the batter is arranged in the base. The interior of the cavity has corrugated sides and bottom 9 with curved ends 10 and it is semicircular transversely as indicated in Fig. 3. In this construction the corrugations extend in a continuous transverse semicircular line about the interior of the cavity. The member 7 is supported in the base by means of a semi-spherical ball 11 coacting with the socket 6 and a shank 12 opposite the ball is adapted to engage a slot 14 in the forward end wall of the base. A wire handle 15 projects from the shank.

On the lower member 7 is positioned a cover 16 having fluted sides 17 to set over a raised rim 18 of the corrugations so as to prevent batter from running over the edge. The cover has a semispherical ball 19 supported in the socket 6 and a slot 20 engaged by a pin 21 projecting from the side of the ball 11 permits the removal of the cover and connects the two balls together. The two balls in conjunction with the socket form a ball and socket joint so that the waffle member and its cover can be swung upwardly or turned on its axis. The cover is provided with a wire handle 22 extending from a shank 24 made to be supported on the shank of the lower member. The cover has a longitudinal rib 25 on its underside which is semicircular transversely to coincide with the shape of the cavity.

Figure 4:
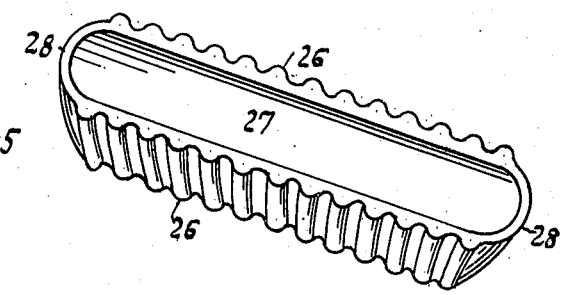
Fig. 4 is a perspective view of an article of food.

In order to produce a waffle of the configuration shown in Fig. 4 the cover is swung upward to uncover the lower member and the batter is poured into one or both of the cavities and the cover is then swung downward to rest on the rim of the lower member. The device can be used with any heat energy such as gas, electric or coal.

The corrugated interior of the cavity thus forms ridges and grooves 26 on the outer portions of the article of food shown in Fig. 4 and the rib with its smooth surface shapes the hollow smooth interior 27. A food article of the kind made according to the above method has its outer sides and bottom corrugated which distinctively forms ridges and grooves in spaced relation to each other thereby reducing the thickness of the wall between the ridges and adjacent to the grooves. The grooves serve to accommodate the bite of a person through the thin part of the wall, especially when the hollow interior is filled after baking, with hot meat such as hamburger steak or a sausage. The interior and exterior of the article is transversely semicircular and the ends 28 are curved outward with smooth interior and exterior surface. There are two elongated cavities shown in the lower member but one or any number could be located in the member. It will be seen that the cover and the lower member both turn together by means of the ball and socket joint, but the cover can be swung upward independent of the lower member or both members can be readily removed from the base.

I claim:

1. A waffle iron comprising a base, a lower member swingingly mounted on the base, said lower member having a transversely semicircular elongated cavity with ridges and grooves adjacent to each other extending in a continuous line transversely about its bottom and sides, and a swinging cover connected to the lower member provided with a transversely semi-circular rib having a smooth exterior surface made to coact with the cavity.

2. A waffle iron comprising a base, a lower member swingingly mounted on the base, said lower member having a transversely semicircular elongated cavity with ridges and grooves adjacent to each other extending in a continuous line transversely about its bottom and sides the ridges being wider than the grooves, and a swinging cover connected to the lower member provided with a transversely semi-circular rib having a smooth exterior surface made to coact with the cavity.

3. A waffle iron comprising a base, a lower member movably mounted on the base, said lower member having a transversely corrugated cavity semicircular in cross-section with round ends including a rim projecting above the top of the base, and a cover removably mounted on the lower member with a semicircular rib to set in the cavity and scalloped edges corresponding with the configuration of the upper side edges of the rim portion of the cavity.

In testimony whereof I have hereunto set my hand.

ELTA SIMMONS.